United States Patent
Omi et al.

(10) Patent No.: US 10,513,257 B2
(45) Date of Patent: Dec. 24, 2019

(54) CONTROL DEVICE FOR HYBRID VEHICLE (71) Applicant: Mitsubishi Jidosha Kogyo Kabushiki Kaisha, Tokyo (JP)

(72) Inventors: Yoshihiro Omi, Okazaki (JP); Katsunori Ueda, Okazaki (JP); Kazunori Handa, Nishio (JP); Masayuki Takagaki, Nukata-gun (JP); Dairoku Ishii, Okazaki (JP)

(73) Assignee: MITSUBISHI JIDOSHA KOGYO KABUSHIKI KAISHA, Tokyo (JP)

( * ) Notice: Subject to any disclaimer, the term of this patent is extended or adjusted under 35 U.S.C. 154(b) by 141 days.

(21) Appl. No.: 14/100,839

(22) Filed: Dec. 9, 2013

(65) Prior Publication Data

US 2014/0163796 A1 Jun. 12, 2014

(30) Foreign Application Priority Data

Dec. 11, 2012 (JP) ................................ 2012-270322

(51) Int. Cl.
*B60K 6/00* (2006.01)
*B60W 20/20* (2016.01)
(Continued)

(52) U.S. Cl.
CPC ............. *B60W 20/20* (2013.01); *B60K 6/442* (2013.01); *B60W 10/06* (2013.01); *B60W 10/08* (2013.01);
(Continued)

(58) Field of Classification Search
CPC .......... B60K 6/48; B60K 6/365; B60K 6/547; B60K 6/442; B60K 6/52; B60K 6/00;
(Continued)

(56) References Cited

U.S. PATENT DOCUMENTS 5,477,826 A * 12/1995 Hara ................... F02D 35/0007
123/339.16
6,053,842 A 4/2000 Kitada et al.
(Continued)

FOREIGN PATENT DOCUMENTS

DE 10 2010 062 484 A1 6/2012
JP 11-280513 A 10/1999
(Continued)

OTHER PUBLICATIONS

European Search Report dated Apr. 14, 2014 for related Application No. EP 13 19 6521.

*Primary Examiner* — Christian Chace
*Assistant Examiner* — Aaron C Smith
(74) *Attorney, Agent, or Firm* — Birch, Stewart, Kolasch & Birch, LLP (57) ABSTRACT

An ignition switch is turned on, and when an abnormality is detected in any of electronic control instruments or sensors, real failure is established, and a fail-safe process is performed. After a lapse of a predetermined period from the establishment of the real failure, fault determination is established, a failure level is sent, and a hybrid fail-safe process is performed. Then, when the abnormality is eliminated, the real failure is not established, and the fail-safe process of an engine is finished. Then, when the ignition switch is turned off and then again turned on, sending of the failure level to a hybrid control unit is stopped, and the hybrid fail-safe process is finished.

5 Claims, 4 Drawing Sheets

| FAILURE LEVEL | HYBRID FAIL-SAFE PROCESS |
|---|---|
| A | EV MODE |
| B | EV MODE OR SERIES MODE (ENGINE OUTPUT LIMIT (LARGE)) |
| C | EV MODE OR SERIES MODE (ENGINE OUTPUT LIMIT (SMALL)) |
| D | PROHIBITION OF PARALLEL MODE |
| E | NO LIMIT |

(51) Int. Cl.
*B60K 6/442* (2007.10)
*B60W 10/06* (2006.01)
*B60W 10/08* (2006.01)
*B60W 20/50* (2016.01)
*F02D 41/22* (2006.01)
*B60K 6/52* (2007.10)
*F02D 11/10* (2006.01)

(52) U.S. Cl.
CPC ............ *B60W 20/50* (2013.01); *F02D 41/22* (2013.01); *B60K 6/52* (2013.01); *F02D 11/106* (2013.01); *F02D 11/107* (2013.01); *F02D 41/222* (2013.01); *Y02T 10/6234* (2013.01); *Y02T 10/6265* (2013.01); *Y10S 903/93* (2013.01)

(58) Field of Classification Search
CPC ...... B60W 10/06; B60W 10/26; B60W 20/00; B60W 20/50; B60W 10/08; B60W 20/20; B60L 3/04; B60L 11/14; B60L 2270/00; Y02T 10/6239; Y02T 10/7275; Y02T 10/6234; Y02T 10/6265; F02D 29/00; F02D 41/222; F02D 41/22; F02D 11/106; Y10S 903/93
See application file for complete search history.

(56) References Cited

U.S. PATENT DOCUMENTS

| | | | |
|---|---|---|---|
| 6,112,150 A * | 8/2000 | Irons et al. | 701/114 |
| 6,276,472 B1 * | 8/2001 | Takashima et al. | 180/65.21 |
| 6,427,100 B1 * | 7/2002 | Kaku et al. | 701/22 |
| 7,813,849 B2 * | 10/2010 | Ochiai et al. | 701/22 |
| 8,688,300 B2 * | 4/2014 | Takahashi et al. | 701/22 |
| 2001/0009147 A1 | 7/2001 | Takashima et al. | |
| 2001/0011051 A1 * | 8/2001 | Hattori | F16H 61/12 477/121 |
| 2002/0163198 A1 | 11/2002 | Gee | |
| 2003/0024504 A1 * | 2/2003 | Bauerle | F02D 9/02 123/396 |
| 2007/0050125 A1 | 3/2007 | Matsuda et al. | |
| 2010/0211286 A1 * | 8/2010 | Tahara | F02D 31/009 701/102 |
| 2012/0000442 A1 | 1/2012 | Takigawa et al. | |

FOREIGN PATENT DOCUMENTS

| | | | |
|---|---|---|---|
| JP | 2006034054 A * | 2/2006 | |
| JP | 2007-40207 A | 2/2007 | |
| JP | 2007-92748 A | 4/2007 | |
| JP | 2010-111291 A | 5/2010 | |
| JP | 2011-231748 A | 11/2011 | |
| JP | 2012-117377 A | 6/2012 | |
| JP | 2012-183866 A | 9/2012 | |

* cited by examiner

| FAILURE LEVEL | HYBRID FAIL-SAFE PROCESS |
|---|---|
| A | EV MODE |
| B | EV MODE OR SERIES MODE (ENGINE OUTPUT LIMIT (LARGE)) |
| C | EV MODE OR SERIES MODE (ENGINE OUTPUT LIMIT (SMALL)) |
| D | PROHIBITION OF PARALLEL MODE |
| E | NO LIMIT |

FIG. 4

| PART NAME | FAILURE LEVEL |
|---|---|
| CRANK ANGLE SENSOR | A |
| ELECTRONIC CONTROL THROTTLE VALVE | B |
| THROTTLE OPENING SENSOR | C |
| INTAKE PRESSURE SENSOR | D |
| AIR-FUEL RATIO SENSOR | E |
| ⋮ | ⋮ |

CONTROL DEVICE FOR HYBRID VEHICLE

BACKGROUND OF THE INVENTION

Field of the Invention

The present invention relates to a control device for a hybrid vehicle, and more particularly to a control device for a hybrid vehicle for switching a travel mode of the vehicle depending on states of an internal combustion engine.

Description of the Related Art

In recent years, a hybrid vehicle has been developed that includes both an internal combustion engine and an electric motor used as power sources. Such a hybrid vehicle performs a fail-safe process such as fuel cut for limiting operation of the internal combustion engine if a control system for the internal combustion engine detects an abnormal sensor output. For example, Japanese Patent Laid-Open No. 2012-117377 discloses a control device including a main accelerator sensor and a sub-accelerator sensor, wherein when an abnormality occurs in both the main accelerator sensor and the sub-accelerator sensor, the control device shifts to an operation mode for limiting an accelerator opening to limit a vehicle speed.

For the hybrid vehicle described in Japanese Patent Laid-Open No. 2012-117377, the vehicle is driven by power of the electric motor and the internal combustion engine, and also a power generator is driven by the power of the internal combustion engine to generate electric power, which is stored in a storage battery.

However, when an abnormality occurs in a sensor of a control system for the internal combustion engine in the hybrid vehicle as described in Japanese Patent Laid-Open No. 2012-117377, for example, performing a fail-safe process for stopping operation of the internal combustion engine is not preferable because the vehicle is caused to travel by the power from the electric motor and the internal combustion engine, and thus power for causing the vehicle to travel is insufficient, thereby making it difficult to properly retract the vehicle.

SUMMARY OF THE INVENTION

The present invention is achieved to solve such a problem, and has an object to provide a control device for a hybrid vehicle that allows safe retraction of a vehicle.

To achieve the object, the present invention provides a control device for a hybrid vehicle, including: a hybrid control unit switching a travel mode of a vehicle depending on a traveling state of the vehicle, among an EV mode in which an internal combustion engine mounted on the vehicle is stopped and drive wheels are driven by a power of the electric motor driven by electric power supplied from a secondary battery mounted on the vehicle, a series mode in which drive wheels are driven by power of the electric motor driven by electric power generated by a power generator driven by power of the internal combustion engine or electric power supplied from the secondary battery, and a parallel mode in which the drive wheels are driven by power of the internal combustion engine and power of the electric motor driven by electric power supplied from the secondary battery, a plurality of sensors that detect an operation state of the internal combustion engine; and an internal combustion engine control unit for controlling operation of the internal combustion engine based on a signal from the hybrid control unit and detection values from the plurality of sensors and, wherein the hybrid control unit includes a hybrid fail-safe process by which the travel mode is set based on each abnormality in each of the plurality of sensors, when an abnormality is detected in any of the plurality of sensors, the hybrid control unit switches the travel mode from the travel mode depending on the traveling state of the vehicle to the travel mode corresponding to the hybrid fail-safe process.

Thus, when an abnormality occurs in the sensor of the internal combustion engine, the travel mode is switched to the travel mode corresponding to the hybrid fail-safe process set based on the abnormality of the sensor, thereby allowing traveling of the hybrid vehicle and allowing safe retraction of the hybrid vehicle.

BRIEF DESCRIPTION OF THE DRAWINGS

The present invention will become more fully understood from the detailed description given hereinafter and the accompanying drawings which are given by way of illustration only, and thus, are not limitative of the present invention, and wherein.

DETAILED DESCRIPTION OF THE INVENTION

Now, an embodiment of the present invention will be described with reference to the drawings.

Figure 1:
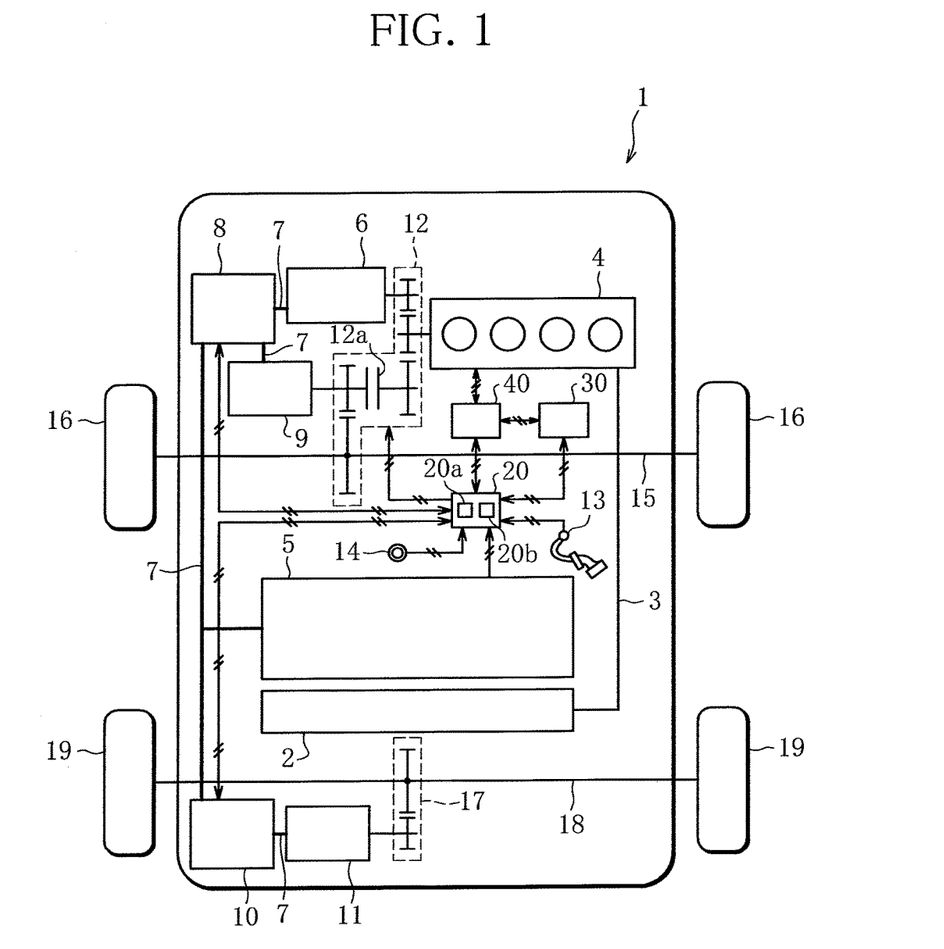
FIG. 1 is a schematic diagram of a vehicle to which a control device for a hybrid vehicle according to the present invention is applied.
Figure 2:
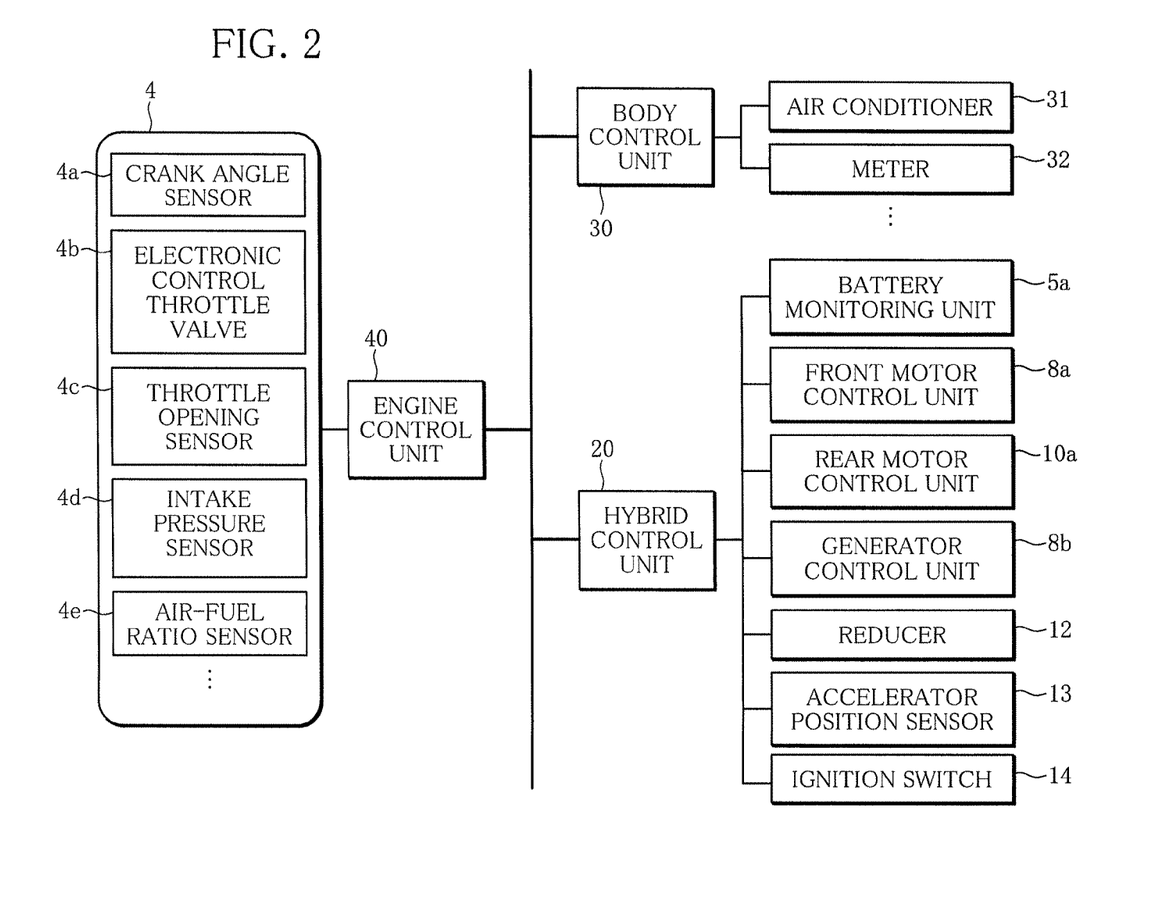
FIG. 2 is a block diagram of the control device for a hybrid vehicle according to the present invention.
Figure 3:
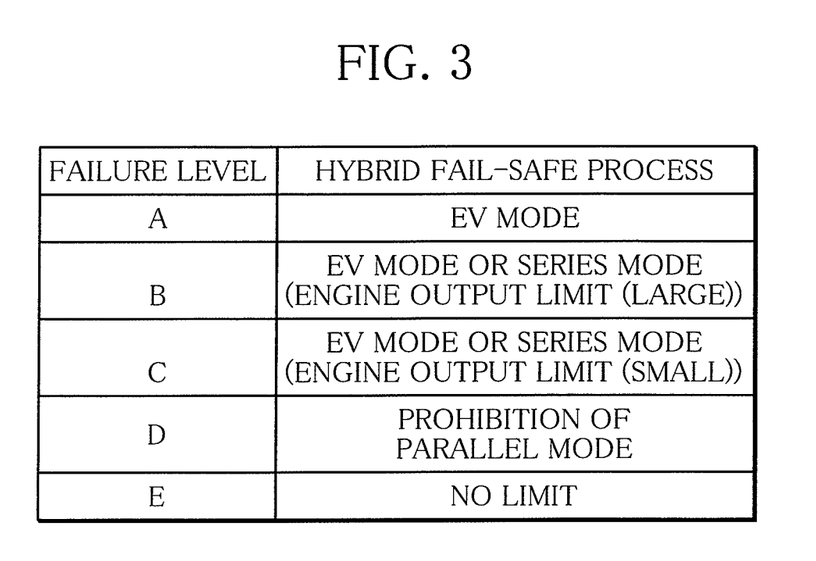
FIG. 3 shows correspondence between each failure level and a hybrid fail-safe process.
Figure 4:
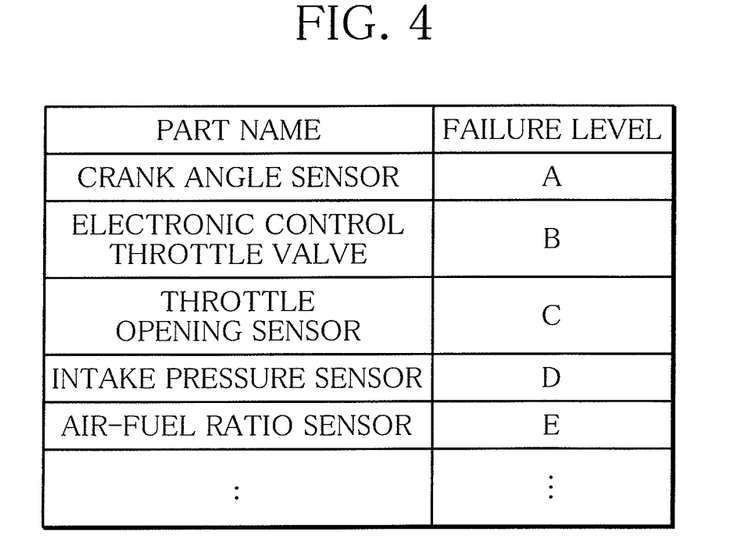
FIG. 4 shows an example of correspondence between each sensor and the failure level.

FIG. 1 is a schematic diagram of a vehicle including a control device for a hybrid vehicle according to the present invention. FIG. 2 is a block diagram of the control device for a hybrid vehicle according to the present invention. FIG. 3 shows correspondence between each failure level and a hybrid fail-safe process, and FIG. 4 shows an example of correspondence between each sensor and the failure level. FIG. 4 is an example, and the failure level is assigned to each electronic control instrument or each sensor provided in an engine depending on a degree of influence of an abnormality in each electronic control instrument or sensor on traveling of the vehicle. Now, a configuration of the control device for a hybrid vehicle will be described.

As shown in FIG. 1, the vehicle (hybrid vehicle) 1 that uses the control device for a hybrid vehicle according to the present invention includes, as traveling devices for the vehicle 1, an engine (internal combustion engine) 4 to which fuel is supplied from a fuel tank 2 via a fuel pipe 3, and that drives drive wheels 16 via a reducer 12 and a drive axle 15, a front motor (electric motor) 9 that is provided in a front part of the vehicle 1, to which electric power of a high voltage is supplied from a high voltage battery (secondary battery) 5 and a generator (power generator) 6 via a high voltage circuit 7, whose operation is controlled by a front inverter 8, and that drives the drive wheels 16 via the reducer 12 and the drive axle 15, and a rear motor (electric motor) 11 that is provided in a rear part of the vehicle 1, to which electric power of a high voltage is supplied from the high voltage battery (secondary battery) 5 and the generator (power generator) 6 via the high voltage circuit 7, whose operation is controlled by a rear inverter 10, and that drives drive wheels 19 via a reducer 17 and a drive axle 18, wherein a charge cable extending from an external power supply is connected to a charging inlet lid (not shown), and the high voltage battery 5 can be charged by a charger.

As shown in FIGS. 1 and 2, the control device for a hybrid vehicle according to the present invention includes the engine 4, the high voltage battery 5, the generator 6, the front inverter 8, the front motor 9, the rear inverter 10, the rear motor 11, the reducer 12 including a clutch 12a therein, an accelerator position sensor 13, an ignition switch 14, a hybrid control unit (a hybrid control unit) 20, a body control unit 30, and an engine control unit (an internal combustion engine control unit) 40 provided in the vehicle 1.

The engine 4 includes a plurality of electronic control instruments (corresponding to a plurality of sensors in the present invention) having a detection portion that detects operation and a power feeding state of a motor and a power feeding state to an electromagnetic valve in an electronic control throttle valve 4b that controls a flow rate of air flowing into a combustion chamber (not shown) in the engine 4 or a fuel injection valve that supplies fuel into an intake passage (not shown), and a plurality of sensors (corresponding to a plurality of sensors in the present invention) such as a crank angle sensor 4a that detects a rotation speed of the engine 4, a throttle opening sensor 4c that detects a throttle opening of the electronic control throttle valve 4b, an intake pressure sensor 4d that detects pressure of air sucked from an intake port, and an air-fuel ratio sensor 4e that detects an air-fuel ratio of exhaust air. The engine 4 is controlled by the engine control unit 40 to generate power based on a control signal such as a requested output value supplied from the hybrid control unit 20 to the engine control unit 40. The power generated by the engine 4 is transmitted to the generator 6 via the reducer 12 with a fixed change gear ratio, and the drive axle 15 that drives the drive wheels 16 via the clutch 12a included in the reducer 12.

The high voltage battery 5 includes a secondary battery such as a lithium-ion battery. The high voltage battery 5 also includes a battery module further including a plurality of modules, each module including a plurality of battery cells having a cell monitoring unit that monitors the battery cells, and a battery monitoring unit 5a that monitors a temperature and a state of charge (hereinafter referred to as SOC) of the battery module based on an output of the cell monitoring unit.

The generator 6 is driven by the engine 4 to generate electric power, and supplies the electric power to the high voltage battery 5, the front motor 9, and the rear motor 11 via the front inverter 8. The operation of the generator 6 is controlled by the front inverter 8.

The front inverter 8 includes a front motor control unit 8a and a generator control unit 8b, and controls an amount of electric power generation of the generator 6 and an output of the front motor 9 based on the control signal from the hybrid control unit 20.

The front motor 9 is driven by electric power generated by the generator 6 or electric power stored in the high voltage battery 5, and drives the drive wheels 16 via the reducer 12 and the drive axle 15.

The rear inverter 10 includes a rear motor control unit 10a, and controls an output of the rear motor 11 based on the control signal from the hybrid control unit 20.

The rear motor 11 is driven by electric power generated by the generator 6 or electric power stored in the high voltage battery 5, and drives the drive wheels 19 via the reducer 17 and the drive axle 18.

The reducer 12 includes the clutch 12a therein. The clutch 12a is mounted between the engine 4 and the drive axle 15, and connects/disconnects transmission of power of the engine 4 to the drive axle 15 based on the control signal from the hybrid control unit 20.

The accelerator position sensor 13 detects an operation amount of an accelerator pedal by a driver. The accelerator position sensor 13 provides the operation amount of the accelerator pedal as an accelerator opening to the hybrid control unit 20.

The ignition switch 14 turns on or off a main power supply for allowing traveling of the vehicle 1.

The hybrid control unit 20 is a control device for generally controlling the vehicle 1, and includes an input/output device, a storage device (ROM, RAM, nonvolatile RAM, or the like), a central processing unit (CPU), a timer, or the like. Specifically, the hybrid control unit 20 includes, as shown in FIG. 1, a mode switching portion 20a that switches a travel mode of the vehicle, and an output value control portion 20b that calculates an output value of the internal combustion engine.

To an input side of the hybrid control unit 20, the battery monitoring unit 5a of the high voltage battery 5, the front motor control unit 8a and the generator control unit 8b of the front inverter 8, the rear motor control unit 10a of the rear inverter 10, the accelerator position sensor 13, the ignition switch 14, a sensor that detects a vehicle state such as a vehicle speed sensor (not shown), the body control unit 30, and the engine control unit 40 are connected, and detection information from these instruments are input.

On the other hand, to an output side of the hybrid control unit 20, the front motor control unit 8a and the generator control unit 8b of the front inverter 8, the rear motor control unit 10a of the rear inverter 10, the reducer 12, the body control unit 30, and the engine control unit 40 are connected. The hybrid control unit 20, the body control unit 30, and the engine control unit 40 are connected by a controller area network in which the control units are respectively connected to each other to allow high speed transfer of control information.

The hybrid control unit 20 sends a control signal to the reducer 12, the engine control unit 40, the front motor control unit 8a, the generator control unit 8b, and the rear motor control unit 10a based on detection information of the battery monitoring unit 5a of the high voltage battery 5, the front motor control unit 8a and the generator control unit 8b of the front inverter 8, the rear motor control unit 10a of the rear inverter 10, the accelerator position sensor 13, the ignition switch 14, and a sensor that detects a vehicle state such as a vehicle speed sensor, to control switching of the travel mode, outputs of the engine 4, the front motor 9, and the rear motor 11, and the amount of electric power generation of the generator 6.

Specifically, the travel mode includes an electric vehicle mode (hereinafter referred to as EV mode), a series mode, and a parallel mode. The mode switching portion 20a of the hybrid control unit 20 switches the travel mode to the electric vehicle mode (hereinafter referred to as EV mode) when SOC of the high voltage battery 5 is sufficient and the vehicle speed and load are low. Also, the mode switching portion 20a switches the travel mode to the series mode when the SOC of the high voltage battery 5 is insufficient for the EV mode or when high electric power is required in acceleration or the like. The mode switching portion 20*a* switches the travel mode to the parallel mode in traveling in a high speed region with high efficiency of the engine 4, that is, high fuel efficiency of the engine 4. The output value control portion 20*b* of the hybrid control unit 20 sends a request signal to the engine control unit 40 so as to provide output torque of the engine 4 depending on the amount of electric power generation of the generator 6, the vehicle speed, and the load in the series mode and the parallel mode.

The EV mode is a series mode described later in which the operation of the engine 4 is stopped, the clutch 12*a* in the reducer 12 is disconnected, the front motor 9 and the rear motor 11 are driven by electric power stored in the high voltage battery 5, and the drive wheels 16 and 19 are driven by power of the front motor 9 and the rear motor 11 to cause the vehicle 1 to travel, that is, the engine 4 is not operated.

In the series mode, the clutch 12*a* in the reducer 12 is disconnected, the operation of the engine 4 is controlled, the generator 6 is driven by the engine 4 and, while the high voltage battery 5 is charged with electric power generated by the generator 6 so as to prevent the SOC of the high voltage battery 5 from being less than a predetermined value, the front motor 9 and the rear motor 11 are driven by electric power generated by the generator 6 and electric power stored in the high voltage battery 5, and the drive wheels 16 and 19 are driven by power of the front motor 9 and the rear motor 11 to cause the vehicle 1 to travel. Specifically, the series mode is a mode in which the vehicle 1 is not caused to travel by power of the engine 4.

In the parallel mode, the operation of the engine 4 is controlled, the generator 6 is driven by the engine 4, the front motor 9 and the rear motor 11 are driven by electric power generated by the generator 6 and electric power stored in the high voltage battery 5, the drive wheels 16 and 19 are driven by power of the front motor 9 and the rear motor 11, further, the clutch 12*a* in the reducer 12 is connected, the operation of the engine 4 is controlled, and the drive wheels 16 are driven by power of the engine 4 via the reducer 12 to cause the vehicle 1 to travel. Specifically, the parallel mode is a travel mode in which the vehicle 1 is caused to travel by power of the front motor 9, the rear motor 11, and the engine 4.

The hybrid control unit 20 performs a hybrid fail-safe process for controlling switching of the travel mode and the output of the engine 4 such as among the EV mode (corresponding to a series mode in which driving of the power generator by the internal combustion engine is stopped based on a third degree of influence in the present invention) in FIG. 3, the EV mode or the series mode (engine output limit (large)) or the EV mode or the series mode (engine output limit (small)) (corresponding to the series mode in which the output of the internal combustion engine is limited based on a second degree of influence in the present invention), prohibition of the parallel mode (based on a first degree of influence in the present invention), or no limit. The engine output limit (large) and the engine output limit (small) control the output of the engine 4 so that the engine output falls within each predetermined output value previously set.

The body control unit 30 is a control device for generally controlling an air conditioner 31, a meter 32, or the like of the vehicle 1, and includes an input/output device, a storage device (ROM, RAM, nonvolatile RAM, or the like), a central processing unit (CPU), a timer, or the like. The body control unit 30 provides control information to the hybrid control unit 20 and the engine control unit 40.

The engine control unit 40 is a control device for generally controlling the engine 4, and includes an input/output device, a storage device (ROM, RAM, nonvolatile RAM, or the like), a central processing unit (CPU), a timer, or the like.

To an input side of the engine control unit 40, a plurality of electronic control instruments such as the electronic control throttle valve 4*b* or the fuel injection valve provided in the engine 4, a plurality of sensors such as the crank angle sensor 4*a*, the throttle opening sensor 4*c*, the intake pressure sensor 4*d*, and the air-fuel ratio sensor 4*e* provided in the engine 4, the hybrid control unit 20, and the body control unit 30 are connected, and detection information from these instruments and sensors are input.

On the other hand, to an output side of the engine control unit 40, the plurality of electronic control instruments provided in the engine 4, the hybrid control unit 20, and the body control unit 30 are connected.

The engine control unit 40 controls the operation of the plurality of electronic control instruments to control a fuel injection amount and an intake air amount so as to provide an engine output requested by the output value control portion 20*b* of the hybrid control unit 20 based on a request signal of the engine output sent from the hybrid control unit 20.

When an abnormality is detected in any of the plurality of electronic control instruments or the plurality of sensors provided in the engine 4, the engine control unit 40 sends a failure level corresponding to the plurality of electronic control instruments or the plurality of sensors as in an example shown in FIG. 4 to the hybrid control unit 20. The engine control unit 40 performs a fail-safe process corresponding to an abnormality in the plurality of electronic control instruments and the plurality of sensors, such as, for example, lighting of an engine warning light or setting of an opening of the throttle valve of the electronic control throttle valve 4*b* to a predetermined opening.

Now, a flow of a process will be described when an abnormality occurs in any of the plurality of electronic control instruments or the plurality of sensors provided in the engine 4 of the control device for a hybrid vehicle according to the present invention thus configured.

Figure 5:
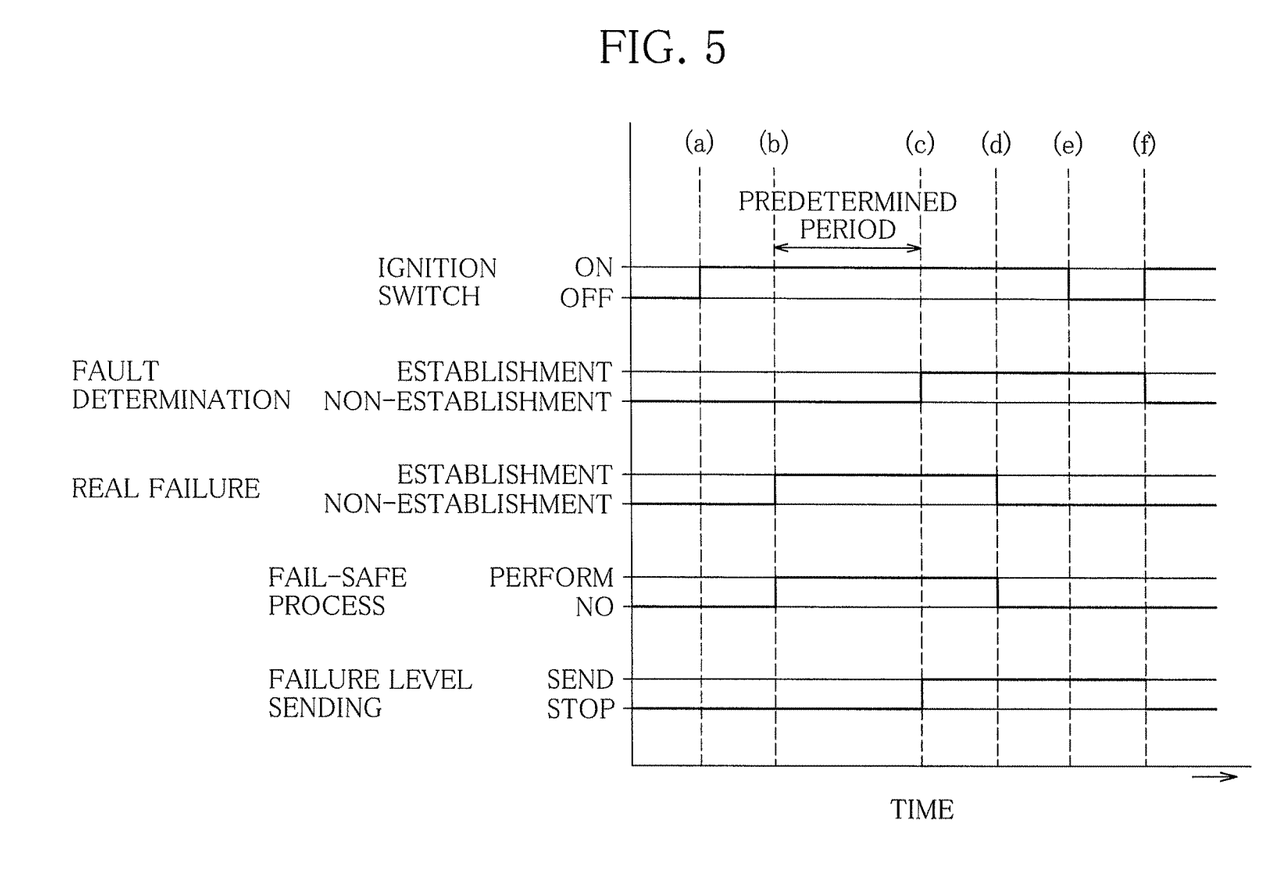
FIG. 5 is a time chart of a process in a fault of an electronic control instrument or a sensor.

FIG. 5 is a time chart of a process in a fault of the electronic control instrument or the sensor. In FIG. 5, ON/OFF of an ignition switch, establishment/non-establishment of fault determination, establishment/non-establishment of real failure, presence/absence of performance of a fail-safe process, and sending/stopping of a failure level signal are shown from the top. The establishment/non-establishment of the fault determination indicates timing when an abnormality is detected in any of the plurality of electronic control instruments or the plurality of sensors, and the engine control unit 40 determines a fault of any of the plurality of electronic control instruments or the plurality of sensors. The establishment/non-establishment of the real failure indicates timing when an abnormality is detected in any of the plurality of electronic control instruments or the plurality of sensors, and the engine control unit 40 determines that an abnormality has occurred in any of the plurality of electronic control instruments or the plurality of sensors. The performance of the fail-safe process indicates timing when the engine control unit 40 performs the fail-safe process by the engine 4 corresponding to an abnormality in any of the plurality of electronic control instruments or the plurality of sensors, such as, for example, lighting of an engine warning light or setting of an opening of the throttle valve of the electronic control throttle valve 4*b* to a predetermined opening. The sending/stopping of a failure level indicates timing of sending or stopping sending of the failure level from the engine control unit 40 to the hybrid control unit 20.

As shown in FIG. 5, a driver turns on the ignition switch 14 (a). Then, when an abnormality is detected in any of the plurality of electronic control instruments or the plurality of sensors provided in the engine 4, the engine control unit 40 establishes real failure, and further performs the fail-safe process (b). The fail-safe process is performed here together with establishment of the real failure, but there is no need to perform the fail-safe process together with establishment of the real failure, for example, when an abnormality in any of the plurality of electronic control instruments or the plurality of sensors provided in the engine 4 has a small influence on operation performance or exhaust performance of the engine 4, and the fail-safe process is only lighting of the engine warning light. Specifically, start timing of the fail-safe process may be varied depending on a degree of influence, on the engine 4, of the abnormality in the plurality of electronic control instruments or the plurality of sensors provided in the engine 4. After establishment of the real failure, that is, after a lapse of a predetermined period from detection of an abnormality in any of the plurality of electronic control instruments or the plurality of sensors, the engine control unit 40 establishes the fault determination, and sends a failure level assigned depending on the degree of influence on traveling of the vehicle shown in FIG. 4 corresponding to the electronic control instrument or the sensor with the abnormality. Then, the hybrid control unit 20 performs a hybrid fail-safe process corresponding to the failure level in FIG. 3 (c).

For example, when an abnormality occurs in the crank angle sensor 4a, the degree of influence on traveling of the vehicle is a third degree of influence, and a failure level "A" assigned to the crank angle sensor 4a shown in FIG. 4 and corresponding to the third degree of influence is sent to the hybrid control unit 20. Since the failure level received is the failure level "A", the mode switching portion 20a and the output value control portion 20b of the hybrid control unit 20 switch the travel mode to the EV mode based on FIG. 3, stop the engine 4, drive the front motor 9 and the rear motor 11 by electric power stored in the high voltage battery 5, and drive the drive wheels 16, 19 by power of the front motor 9 and the rear motor 11 to cause the vehicle 1 to travel. Then, when the fault of the electronic control instrument or the sensor in which the abnormality has been detected is repaired and the abnormality is eliminated, the engine control unit 40 does not establish real failure, and finishes the fail-safe process of the engine 4. The engine control unit 40 maintains sending of the failure level to the hybrid control unit 20 (d). Then, when the ignition switch 14 is turned off (e) and then again turned on, the engine control unit 40 stops sending of the failure level to the hybrid control unit 20. Then, the hybrid control unit 20 finishes the hybrid fail-safe process, and controls, by means of the mode switching portion 20a and the output value control portion 20b, the switching of the travel mode and the outputs of the engine 4, the front motor 9, and the rear motor 11 based on detection information of the battery monitoring unit 5a of the high voltage battery 5, the front motor control unit 8a and the generator control unit 8b of the front inverter 8, the rear motor control unit 10a of the rear inverter 10, the accelerator position sensor 13, the ignition switch 14, and a sensor that detects a vehicle state such as a vehicle speed sensor (f).

When an abnormality occurs in the throttle opening sensor 4c, for example, the degree of influence on traveling of the vehicle is a second degree of influence, and a failure level "C" assigned to the throttle opening sensor 4a shown in FIG. 4 and corresponding to the second degree of influence is sent to the hybrid control unit 20. Since the failure level received is the failure level "C", the mode switching portion 20a of the hybrid control unit 20 switches the travel mode to the EV mode or the series mode (engine output limit (small)) based on FIG. 3.

Further, when an abnormality occurs in the intake pressure sensor 4d, for example, the degree of influence on traveling of the vehicle is a first degree of influence, and a failure level "D" assigned to the intake pressure sensor 4d shown in FIG. 4 and corresponding to the first degree of influence is sent to the hybrid control unit 20. Since the failure level received is the failure level "D", the mode switching portion 20a of the hybrid control unit 20 prohibits the parallel mode and switches the travel mode to the series mode based on FIG. 3.

Thus, in the control device for a hybrid vehicle according to the present invention, when an abnormality is detected in any of the plurality of electronic control instruments or the plurality of sensors provided in the engine 4, the engine control unit 40 establishes real failure. After a lapse of a predetermined period from the establishment of the real failure, the engine control unit 40 sends, to the hybrid control unit 20, a failure level assigned depending on the degree of influence on traveling of the vehicle corresponding to the electronic control instrument or the sensor with the abnormality. The hybrid control unit 20 performs the hybrid fail-safe process for controlling the switching of the travel mode and the output of the engine 4 to any of the EV mode, the EV mode or the series mode (engine output limit (large)), the EV mode or the series mode (engine output limit (small)), prohibition of the parallel mode, or no limit that corresponds to the failure level sent from the engine control unit 40. Then, when the fault of the electronic control instrument or the sensor in which the abnormality has been detected is repaired and the abnormality is eliminated, the engine control unit 40 does not establish real failure. Then, when the ignition switch 14 is turned off and then again turned on, the engine control unit 40 stops sending of the failure level to the hybrid control unit 20. The hybrid control unit 20 cancels the hybrid fail-safe process depending on the failure level, and controls switching of the travel mode and the outputs of the engine 4, the front motor 9, and the rear motor 11 based on the state of the vehicle 1.

Thus, based on the failure level sent from the engine control unit 40, the hybrid fail-safe process is switched to control the switching of the travel mode and the output of the engine 4 to the EV mode (corresponding to the third degree of influence), the EV mode or the series mode (engine output limit (large)) or the EV mode or the series mode (engine output limit (small)) (corresponding to the second degree of influence), prohibition of the parallel mode (corresponding to the first degree of influence), and no limit, in descending order of the degree of influence of the failure level on traveling of the vehicle 1 (third degree of influence>second degree of influence>first degree of influence). Thus, when the engine 4 cannot be operated due to an abnormality in the electronic control instrument or the sensor which has a high degree of influence on traveling of the vehicle 1, the travel mode is set by the hybrid fail-safe process so that the operation of the engine 4 is stopped, the drive wheels 16, 19 are driven by power generated by the front motor 9 and the rear motor 11 to allow traveling of the vehicle 1, thereby allowing safe retraction of the vehicle 1. On the other hand, when the engine 4 can be operated because the abnormality occurring in the electronic control instrument or the sensor has a low degree of influence on traveling of the vehicle 1, the travel mode is switched to the series mode, further, an instruction to reduce the output of the engine 4 is given to the engine control unit 40 to limit the output of the engine 4, thereby allowing safe retraction of the vehicle 1, and preventing a secondary fault of the engine 4 due to high-load operation of the engine 4.

When an abnormality is detected in any of the plurality of electronic control instruments or the plurality of sensors, the engine control unit 40 sends a failure level to the hybrid control unit 20 after a lapse of a predetermined period from the detection of the abnormality, and the hybrid control unit 20 performs the hybrid fail-safe process to allow the vehicle 1 to travel as usual during the predetermined period, thereby allowing safer retraction of the vehicle.

The description on the embodiment of the present invention is now finished, but the present invention is not limited to the embodiment.

For example, in the embodiment, the failure level is assigned to each electronic control instrument or each sensor provided in the engine 4 depending on the degree of influence of the abnormality in each electronic control device or each sensor on traveling of the vehicle. However, not limited to this, the failure level may be assigned to each type of abnormality in each of the plurality of electronic control instruments or the plurality of sensors provided in the engine 4 depending on the degree of influence of each type of abnormality on traveling of the vehicle. The failure level is thus set for each abnormality in each electronic control instrument or each sensor, and thus a hybrid fail-safe process can be changed between different abnormalities in the same electronic control instrument or different abnormalities in the same sensor, thereby allowing a hybrid fail-safe process depending on abnormalities, and preventing a secondary fault of the engine 4.

In the above described embodiment, the failure level depending on the degree of influence of the abnormality in the electronic control instrument or the sensor provided in the engine 4 on traveling of the vehicle 1 is sent to the hybrid control unit 20. However, not limited to this, a failure level depending on a degree of influence, on traveling of the vehicle 1, of, for example, an abnormality in an engine body such as overheat of the engine 4 or abnormal hydraulic pressure of the engine 4, or an abnormality in a vehicle body in collision of the vehicle 1, or the like may be set, and sent to the hybrid control unit 20. Also, a failure level depending on a degree of influence, on traveling of the vehicle 1, of a communication abnormality between the engine control unit 40 and the hybrid control unit 20, or a communication abnormality between the engine control unit 40 and the body control unit 30 may be similarly set, and sent to the hybrid control unit 20.

In the above described embodiment, when an abnormality occurs in any of the electronic control instruments or the sensors, the failure level corresponding to the abnormality is sent, but not limited to this. For example, when abnormalities simultaneously occur in the plurality of electronic control instruments or sensors, or abnormalities occurs at intervals, a failure level of an abnormality that has a higher degree of influence on traveling of the vehicle 1 may be sent to the hybrid control unit 20. This can prevent a secondary fault of the engine 4 and allow safe retraction of the vehicle 1 even when a plurality of abnormalities occur.

What is claimed is:

1. A control device for a hybrid vehicle comprising:
   a hybrid control unit switching a travel mode of a vehicle depending on a traveling state of the vehicle, among an EV mode in which an internal combustion engine mounted on the vehicle is stopped and drive wheels are driven by a power of the electric motor driven by electric power supplied from a secondary battery mounted on the vehicle, a series mode in which the drive wheels are driven by power of the electric motor driven by electric power generated by a power generator driven by power of the internal combustion engine or electric power supplied from the secondary battery, and a parallel mode in which the drive wheels are driven by power of the internal combustion engine and power of the electric motor driven by electric power supplied from the secondary battery;
   a plurality of sensors that detect an operation state of the internal combustion engine; and
   an internal combustion engine control unit for controlling operation of the internal combustion engine based on a signal from the hybrid control unit and detection values from the plurality of sensors, wherein
   the hybrid control unit includes a hybrid fail-safe process by which the travel mode is set based on each abnormality in each of the plurality of sensors, and
   when an abnormality is detected in any of the plurality of sensors, the hybrid control unit switches the travel mode from the travel mode depending on the traveling state of the vehicle to the travel mode corresponding to the hybrid fail-safe process,
   the hybrid fail-safe process includes,
      a process selecting the EV mode,
      a process selecting the EV mode or the series mode and an output of the internal combustion engine is limited wherein an amount the output of the internal combustion engine that is limited is determined according to each abnormality in each of the plurality of sensors, and
      a process selecting the EV mode or the series mode and the output of the internal combustion engine is not limited.

2. The control device for a hybrid vehicle according to claim 1, wherein
   the internal combustion engine control unit performs a fail-safe process of the internal combustion engine when the abnormality is detected in any of the plurality of sensors, and includes an abnormality determination information corresponding to each abnormality in each of the plurality of sensors,
   the hybrid control unit receives the abnormality determination information from the internal combustion engine, and performs the hybrid fail-safe process.

3. The control device for a hybrid vehicle according to claim 2, wherein
   the plurality of sensors for detecting the operation state of the internal combustion engine include a crank angle sensor that detects a rotational angle of a crank of the internal combustion engine,
   the internal combustion engine control unit stops operation of the internal combustion engine as the fail-safe process when the abnormality of the crank angle sensor is detected, and includes the abnormality determination information corresponding to the abnormality of the crank angle sensor, and
   the hybrid control unit sets the hybrid fail-safe process to the EV mode based on the abnormality determination information.

4. A control device for a hybrid vehicle comprising:
   a hybrid control unit switching a travel mode of a vehicle depending on a traveling state of the vehicle, among an EV mode in which an internal combustion engine mounted on the vehicle is stopped and drive wheels are driven by a power of the electric motor driven by electric power supplied from a secondary battery mounted on the vehicle, a series mode in which the drive wheels are driven by power of the electric motor driven by electric power generated by a power generator driven by power of the internal combustion engine or electric power supplied from the secondary battery, and a parallel mode in which the drive wheels are driven by power of the internal combustion engine and power of the electric motor driven by electric power supplied from the secondary battery;

a plurality of sensors that detect an operation state of the internal combustion engine; and an internal combustion engine control unit for controlling operation of the internal combustion engine based on a signal from the hybrid control unit and detection values from the plurality of sensors, wherein the hybrid control unit includes a hybrid fail-safe process by which the travel mode is set based on each abnormality in each of the plurality of sensors, and when an abnormality is detected in any of the plurality of sensors, the hybrid control unit switches the travel mode from the travel mode depending on the traveling state of the vehicle to the travel mode corresponding to the hybrid fail-safe process, the hybrid fail-safe process includes,
  a process selecting the EV mode,
  a process selecting a mode prohibiting the parallel mode, and
  a process selecting a mode where an output of the internal combustion engine is not limited, and the mode prohibiting the parallel mode includes limiting an output of the internal combustion engine corresponding to each abnormality in each of the plurality of sensors, the plurality of sensors for detecting the operation state of the internal combustion engine include an intake pressure sensor that detects pressure of air sucked into the internal combustion engine, and a throttle opening sensor that detects a throttle opening of a throttle valve for controlling a flow rate of air flowing into the internal combustion engine, the internal combustion engine control unit operates the internal combustion engine with the fail-safe process corresponding to each abnormality in each of the intake pressure sensor and the throttle opening sensor when the abnormality is detected in the intake pressure sensor and the throttle opening sensor, and the hybrid control unit sets the hybrid fail-safe process to the prohibition of the parallel mode based on the abnormality determination information, and limits an output of the internal combustion engine for the abnormality of the throttle opening sensor by a larger amount than for the abnormality of the intake passage pressure sensor.

5. A control device for a hybrid vehicle comprising:
a hybrid control unit switching a travel mode of a vehicle depending on a traveling state of the vehicle, among,
  an EV mode in which an internal combustion engine mounted on the vehicle is stopped, a clutch which connects/disconnects transmission of power of the engine to drive wheels is disconnected, and drive wheels are driven by a power of the electric motor driven by electric power supplied from a secondary battery mounted on the vehicle,
  a series mode in which the drive wheels are driven by power of the electric motor driven by electric power generated by a power generator driven by power of the internal combustion engine or electric power supplied from the secondary battery in a state the clutch is disconnected, and
  a parallel mode in which the drive wheels are driven by power of the internal combustion engine and power of the electric motor driven by electric power supplied from the secondary battery in a state that the clutch is connected;

a plurality of sensors that detect an operation state of the internal combustion engine; and an internal combustion engine control unit for controlling operation of the internal combustion engine based on a signal from the hybrid control unit and detection values from the plurality of sensors, wherein the hybrid control unit includes a hybrid fail-safe process by which the travel mode is set based on each abnormality in each of the plurality of sensors, and when an abnormality is detected in any of the plurality of sensors, the hybrid control unit switches the travel mode from the travel mode depending on the traveling state of the vehicle to the travel mode corresponding to the hybrid fail-safe process, and the hybrid fail-safe process includes a travel mode in which the clutch is permitted to connect and a travel mode in which the clutch is disconnected, and the travel mode in which the clutch is disconnected limits an output of the internal combustion engine corresponding to each abnormality in each of the plurality of sensors.

* * * * *